(12) United States Patent
Kuroi (10) Patent No.: US 8,184,369 B2
(45) Date of Patent: May 22, 2012

(54) SCREEN UNIT (75) Inventor: Kiyoshi Kuroi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 4 days.

(21) Appl. No.: 12/952,363

(22) Filed: Nov. 23, 2010

(65) Prior Publication Data
US 2011/0141559 A1 Jun. 16, 2011

(30) Foreign Application Priority Data

Dec. 10, 2009 (JP) ................ 2009-280180

(51) Int. Cl.
*G03B 21/58* (2006.01)
(52) U.S. Cl. .................. 359/461; 359/443; 359/451
(58) Field of Classification Search .......... 359/156, 359/443, 461, 451; 156/60, 91
See application file for complete search history.

(56) References Cited

U.S. PATENT DOCUMENTS

| 6,297,905 B1* | 10/2001 | Takamoto et al. ............ 359/461 |
| 7,864,418 B2* | 1/2011 | Kuroi et al. .................... 359/443 |
| 2009/0190212 A1* | 7/2009 | Wang et al. .................... 359/461 |

FOREIGN PATENT DOCUMENTS

JP 2009-229915 A 10/2009

* cited by examiner

*Primary Examiner* — Clayton E LaBalle
*Assistant Examiner* — Kevin Butler
(74) *Attorney, Agent, or Firm* — AdvantEdge Law Group, LLC (57) ABSTRACT

A screen unit includes: a screen having a first side, a second side, and a pair of crossing sides which cross the first side and the second side; a winding shaft holding the first side and functioning as a shaft around which the screen is wound; a supporting portion supporting the second side; a pair of string-shaped members provided between the winding shaft and the supporting portion and disposed outside the pair of the crossing sides of the screen in the directions along the pair of the crossing sides; and a plurality of connecting members provided on the pair of the crossing sides to connect the screen and the pair of the string-shaped members, wherein the pair of the crossing sides are curved toward the inside of the screen, and cushioning members are provided in such a manner as to cover at least the pair of the string-shaped members.

3 Claims, 6 Drawing Sheets

SCREEN UNIT

BACKGROUND

1. Technical Field

The present invention relates to a screen unit.

2. Related Art

A type of screen unit which expands a screen when the screen is used and winds and accommodates the screen when the screen is not used is known. An example of this type of screen unit currently proposed includes a screen which has a pair of crossing sides opposed in a direction crossing the winding direction of the screen (hereinafter referred to as a crossing direction as well) and curved toward the inside, pipe-shaped members provided on both the crossing sides, string-shaped members extended along the respective crossing sides and inserted into the pipe-shaped members, and a mechanism for giving tension to the respective string-shaped members in the directions along the respective crossing sides (for example, see JP-A-2009-229915).

According to the structure of this screen unit which gives tension to the respective string-shaped members in the directions along the crossing sides, the screen is tensioned not only in the screen winding direction but also in the crossing direction. Thus, the flatness of the screen increases.

According to this screen unit, however, the screen is damaged by the contact between the string-shaped members provided along the curved crossing sides of the screen and the base material of the screen in the winding condition of the screen. Moreover, under the winding condition, deformations such as depressions are produced on the base material of the screen by the steps produced by the string-shaped members.

For solving these problems, a screen unit proposed in JP-A-2009-229915 contains pipe-shaped members having sufficiently large lengths in the crossing direction such that the string-shaped members can be positioned outside the portions of the crossing sides having the largest width between the crossing sides. In this case, the string-shaped members do not overlap with the screen under the winding condition of the screen, thereby preventing damage and deformation of the base material of the screen.

According to this structure of the screen unit, the damage and deformation of the base material of the screen are avoided. However, since the string-shaped members are disposed farther outward from the crossing sides of the screen, the size of the screen unit increases. Moreover, the pipe-shaped members provided on both the crossing sides of the screen become longer in the crossing direction, which deteriorates the appearance of the screen in the expanded condition.

SUMMARY

It is an advantage of some aspects of the invention to provide a technology capable of solving at least a part of the problems described above and the invention can be embodied as the following forms or application examples.

Application Example 1

A screen unit according to this application example of the invention includes: a screen having a first side, a second side, and a pair of crossing sides which cross the first side and the second side; a winding shaft holding the first side and functioning as a shaft around which the screen is wound; a supporting portion supporting the second side; a pair of string-shaped members provided between the winding shaft and the supporting portion and disposed outside the pair of crossing sides of the screen in the directions along the pair of crossing sides; and a plurality of connecting members provided on the pair of crossing sides to connect the screen and the pair of string-shaped members. The pair of crossing sides are curved toward the inside of the screen. Cushioning members are provided in such a manner as to cover at least the pair of the string-shaped members.

According to this structure, the pair of string-shaped members are disposed between the winding shaft around which the screen is wound and the supporting portion. Thus, the respective string-shaped members as well as the screen are tensioned in the direction of winding the screen when the screen is expanded. The respective string-shaped members are provided outside the pair of crossing sides of the screen curved toward the inside along the respective crossing sides. Thus, the screen is also tensioned in the crossing direction which crosses the direction of winding the screen via the plural connecting members. Accordingly, winding curls and wrinkles in the vicinity of the crossing sides of the screen can be reduced, which increases the flatness of the screen.

Moreover, even when the respective string-shaped members wound around the winding shaft together with the screen overlap with the screen, contact between the string-shaped members and the base material of the screen can be avoided by the function of the cushioning members covering the string-shaped members and separating the string-shaped members from the screen. In this structure, the respective string-shaped members can be disposed closer to the corresponding crossing sides, and thus each length of the connecting members in the crossing direction can be reduced. Accordingly, size increase of the screen unit and deterioration of the appearance in the expanded condition of the screen can be reduced while preventing damage to the base material of the screen produced by the contact between the string-shaped members and the base material of the screen.

Application Example 2

A screen unit according to this application example of the invention includes: a screen having a first side, a second side, and a pair of crossing sides which cross the first side and the second side; a winding shaft holding the first side and functioning as a shaft around which the screen is wound; a supporting portion supporting the second side; a pair of string-shaped members provided between the winding shaft and the supporting portion and disposed outside the pair of the crossing sides of the screen in the directions along the pair of the crossing sides; and a plurality of connecting members provided on the pair of the crossing sides to connect the screen and the pair of the string-shaped members. The pair of the crossing sides are curved toward the inside of the screen. The first side and the second side extend substantially in parallel with each other. Cushioning members are provided at least either on a projection surface side of the screen or on aside opposite to the projection surface side and are disposed in belt shapes in directions substantially perpendicular to the first side and the second side to cover the string-shaped members and the connecting members.

According to this structure, size increase of the screen unit and deterioration of the appearance in the expanded condition of the screen can be reduced while increasing the flatness of the screen and preventing damage to the base material of the screen produced by the contact between the string-shaped members and the base material of the screen.

In addition, according to this structure, the projection surface sides of the pair of the string-shaped members and the plural connecting members disposed on the respective crossing sides of the screen are covered by the cushioning members. In this case, the string-shaped members and the connecting members are not visually recognized from the projection surface side of the screen. Thus, the appearance of the screen unit in the expanded condition of the screen improves. Moreover, the cushioning members are disposed in the belt shapes in the directions substantially perpendicular to the first side and the second side extending approximately in parallel with each other. Thus, the shape of the screen exposed to the projection surface side becomes substantially rectangular. Accordingly, the images displayed on the projection surface of the screen are well defined, which improves the effect of appreciation of the images.

Application Example 3

In the screen unit of the above application example of the invention, it is preferable that a thickness of one of the cushioning members is larger than a thickness of one of the pair of string-shaped members.

According to this structure, the thickness of each of the cushioning members is larger than the thickness of each of the string-shaped members. Thus, steps produced by the string-shaped members can be reduced within the range of the thickness of the cushioning members. Accordingly, deformations on the base material of the screen produced by the steps of the string-shaped members can be more effectively reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

The exemplary embodiments of the invention are hereinafter described with reference to the drawings. In the respective figures referred to herein, the size proportions, angles and the like of the respective components are varied as necessary for easy understanding of the structures.

First Embodiment

Figure 1:
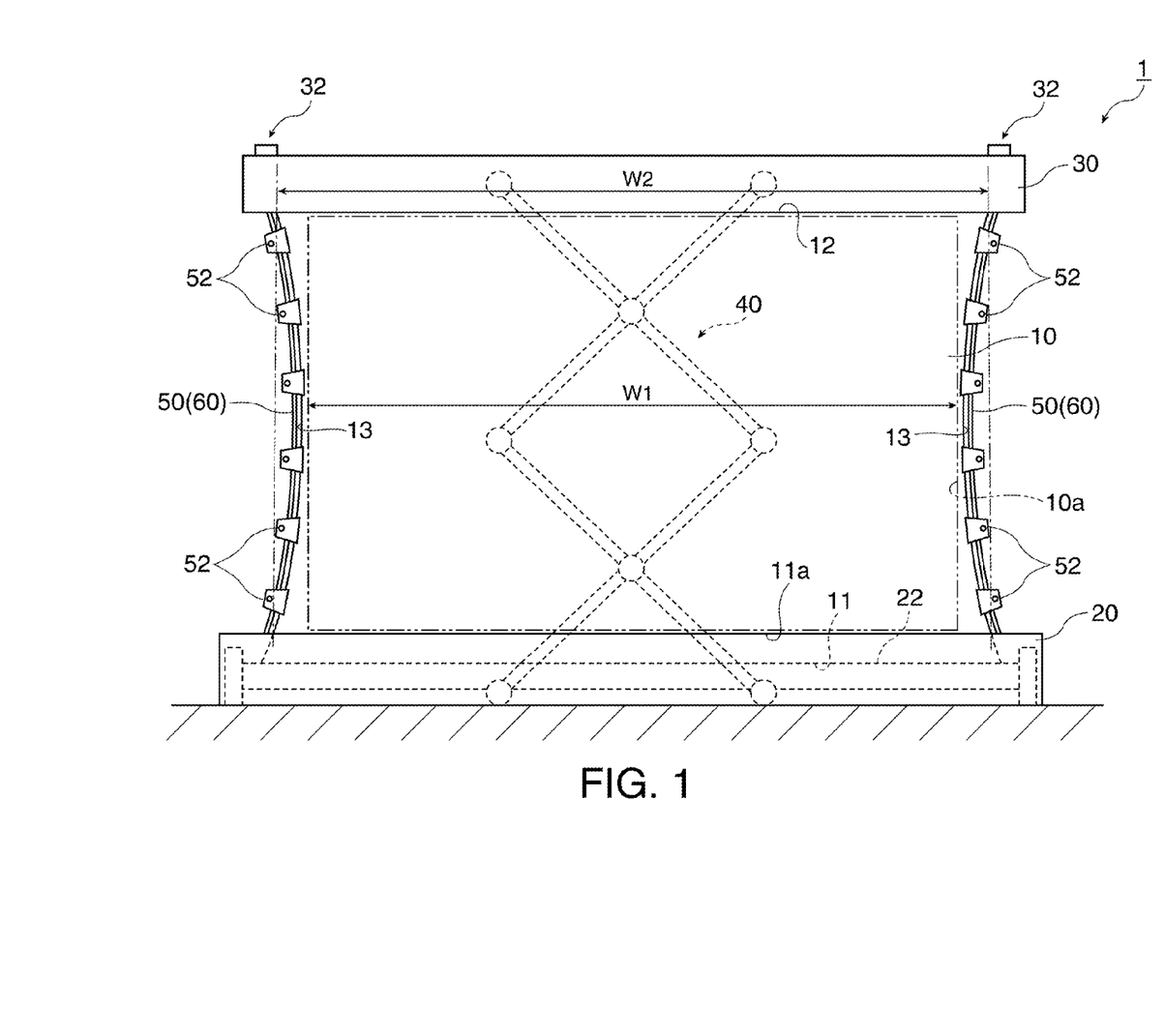
FIG. 1 illustrates the general structure of a screen unit according to a first embodiment.
Figure 2:
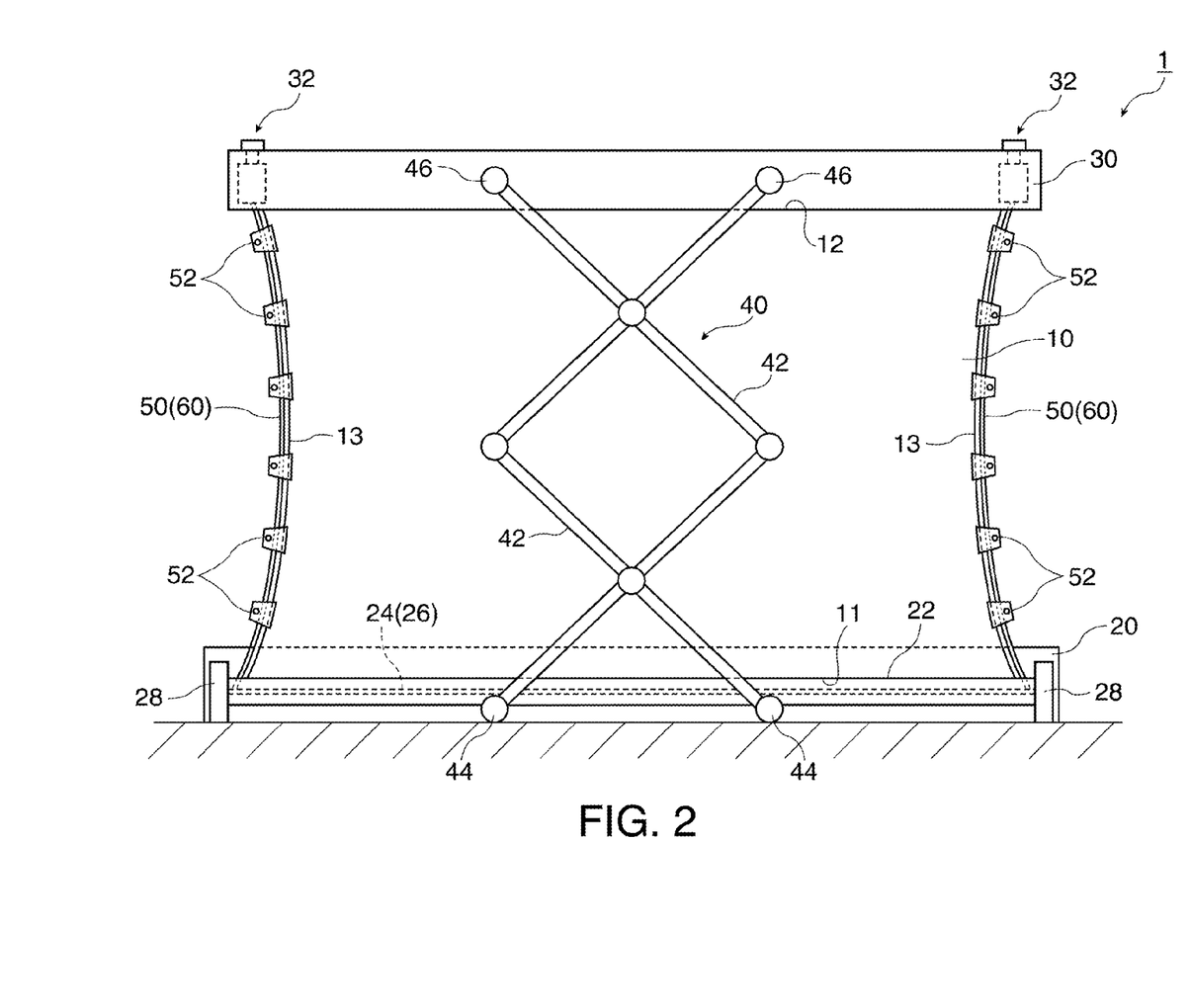
FIG. 2 illustrates the general structure of the screen unit according to the first embodiment.

The general structure of a screen unit according to a first embodiment is now described. FIGS. 1 and 2 illustrate the general structure of the screen unit in the first embodiment. More specifically, FIG. 1 schematically illustrates the screen unit in the expanded condition as viewed from the front, and FIG. 2 schematically illustrates the screen unit in the expanded condition as viewed from the back. In FIG. 2, a storing portion 20 is shown in perspective.

Figure 3:
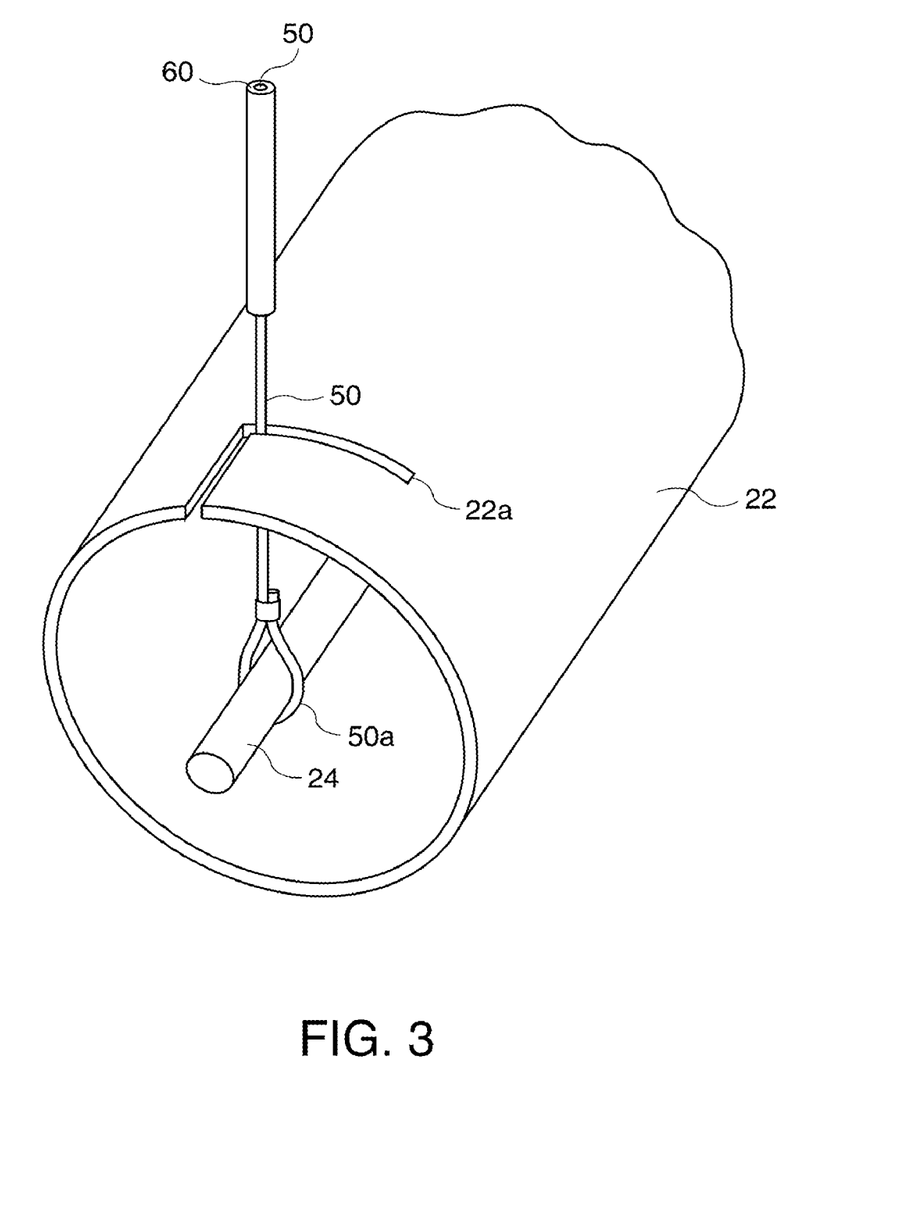
FIG. 3 schematically illustrates an end of a winding shaft.
Figure 4:
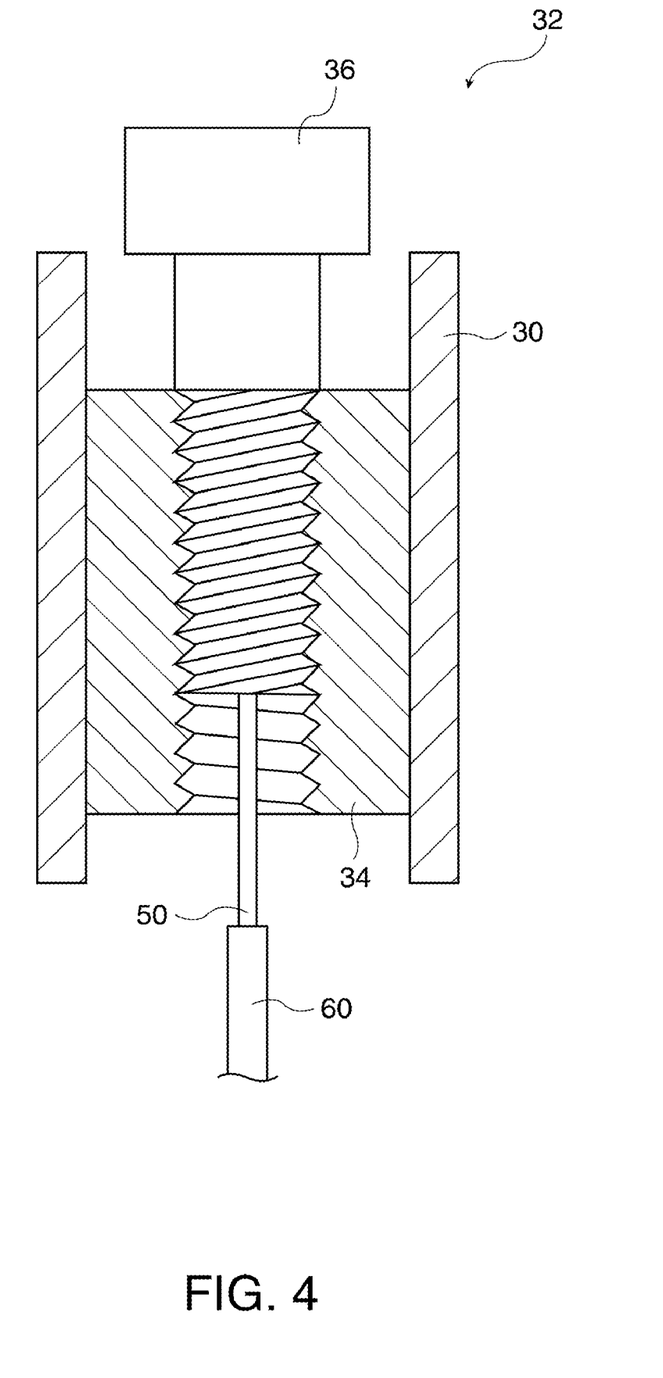
FIG. 4 schematically illustrates a fixing portion of a supporting portion.
Figure 5:
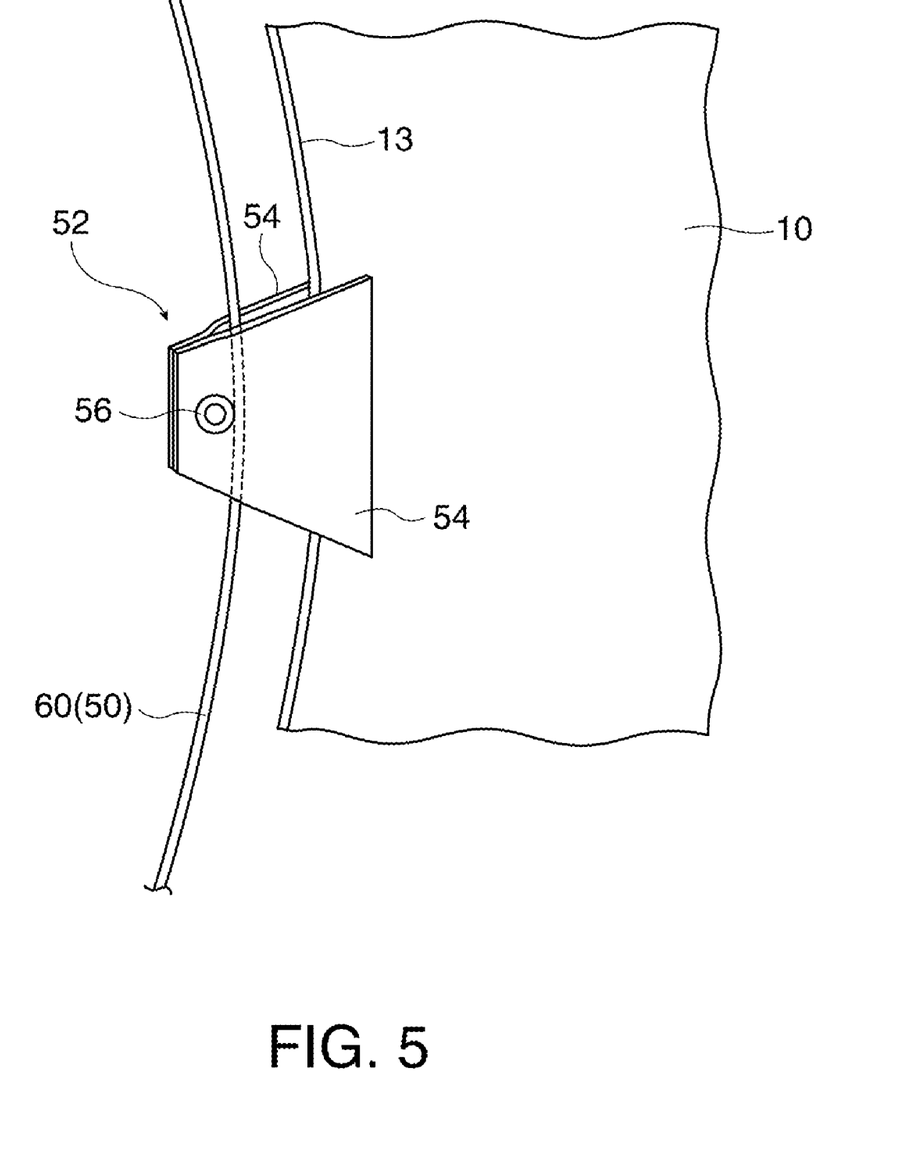
FIG. 5 schematically illustrates an enlarged area around a connecting member.

FIG. 3 schematically illustrates ends of a wire and a winding shaft. FIG. 4 schematically illustrates a fixing portion of a supporting portion. FIG. 5 schematically illustrates an enlarged area around a connecting member. While each of FIGS. 3, 4, and 5 shows only one of both ends of the screen unit 1 in the left-right direction, the other end has the same structure as that shown in the figures.

As illustrated in FIG. 1, the screen unit 1 in the first embodiment includes a screen 10, the storing portion 20 having a winding shaft 22, a supporting portion 30, a coupling mechanism 40, a pair of wires 50 as string-shaped members, a plurality of connecting members 52, and cushioning members 60 covering the wires 50. The screen 10 of the screen unit 1 is drawn out and expanded when the screen unit 1 is used, and wound around the winding shaft 22 and stored in the storing portion 20 when the screen unit 1 is not used. In this embodiment, the screen unit 1 placed on a floor surface as a crosshatched area in the figure will be discussed as an example.

In the following explanation, the direction toward the floor surface on which the screen unit 1 is placed is referred to as the downward direction, and the direction toward the ceiling is referred to as the upward direction in some cases. In addition, when the screen unit 1 is used, the condition in which the screen 10 is expanded upward to form a substantially flat surface as a projection surface is referred to as an expanded condition in some cases. In the expanded condition of the screen 10, the projection surface side and the side opposite to the projection surface side are referred to as the front side and the back side, respectively, in some cases. Also, the right side as viewed from the front and the left side as viewed from the front are referred to as the right and the left, respectively, in some cases.

The screen 10 is a reflection type screen having flexibility, and reflects image light projected from a projector or the like by a projection surface exposed to the front side to display an image, for example. The screen 10 has a side 11 as a first side and a side 12 as a second side opposed to each other, and a pair of crossing sides 13. The side 11 and the second side 12 extend substantially in parallel with each other. The side 11 is supported by the winding shaft 22, and the side 12 is supported by the supporting portion 30.

The pair of the crossing sides 13 cross the side 11 and the side 12 and are disposed opposed to each other in the left-right direction. The pair of the crossing sides 13 are curved toward the inside of the screen 10. That is, the width between the crossing sides 13 of the screen 10 is the smallest at the center in the up-down direction, and gradually increases toward the side 11 and the side 12.

The side 11 of the screen 10 is covered by the storing portion 20 as viewed from the front. The boundary of the screen 10 near the side 11 visually recognized from the front is referred to as a boundary 11a. The boundary 11a is substantially parallel with the side 11. The length of the boundary 11a is the same as the length of the side 12, for example. The area surrounded by the boundary 11a, the side 12, and the pair of the crossing sides 13 corresponds to the projection surface of the screen 10. It is preferable that the projection surface of the screen 10 has a shape of left-right symmetry and rotational symmetry.

The smallest width between the crossing sides 13 on the projection surface of the screen 10 is determined as a width W1, and the largest widths between the crossing sides 13 on the boundary 11a and on the side 12 are determined as widths W2. Generally, an image projected from the projector or the like and displayed on the projection surface of the screen 10 has a rectangular shape. Thus, a rectangular part 10a having the width W1 in the left-right direction on the projection surface of the screen 10 corresponds to the area substantially contributing to the display of the image. In this example, the rectangular part 10a is referred to as a display area 10a as well. When the screen 10 has the display area 10a corresponding to an image of 100 inches, for example, each of the widths W2 is larger than the width W1 by approximately 150 mm.

As illustrated in FIG. 2, the storing portion 20 is positioned on the floor surface side where the screen unit 1 is installed. The storing portion 20 has the winding shaft 22, a center shaft 24, a tensioning mechanism 26, and a pair of bearings 28. The winding shaft 22 formed in a cylindrical shape extends along the side 11, and supports the side 11 of the screen 10. The winding shaft 22 is a shaft around which the screen 10 is wound. The bearings 28 disposed on both ends of the winding shaft 22 in the extending direction of the winding shaft 22 support the winding shaft 22 such that the winding shaft 22 can freely rotate.

The center shaft 24 inserted into the winding shaft 22 extends along the side 11 similarly to the winding shaft 22. The center shaft 24 has the same rotation axis as that of the winding shaft 22, and rotates in accordance with the rotation of the winding shaft 22. The tensioning mechanism 26 has a spring coil for urging the center shaft 24 in the direction of winding the screen 10. The spring coil is of a type typically used, and not shown in the figure. The spring coil is provided in such a manner as to cover the center shaft 24.

When the winding shaft 22 (center shaft 24) is rotated in the direction of drawing the screen 10 out, the tensioning mechanism 26 generates an urging force for rotating the center shaft 24 in the direction of winding the screen 10. Thus, when the screen 10 is expanded, a tension is given to the screen 10 in the up-down direction by the urging force of the tensioning mechanism 26. For storing the screen 10, the screen 10 is wound around the winding shaft 22 by the urging force of the tensioning mechanism 26.

The supporting portion 30 extends along the side 12 of the screen 10 to support the side 12. Fixing portions 32 for fixing the wires 50 are provided at both ends of the supporting portion 30 in the extending direction of the supporting portion 30. The structure of the fixing portions 32 will be described later.

The coupling mechanism 40 extends between the storing portion 20 and the supporting portion 30, and is disposed on the back side of the screen 10. The coupling mechanism 40 is a so-called pantograph mechanism. The coupling mechanism 40 has two pairs of (four) arms 42 connected with one another in such a manner as to freely rotate, for example. Lower ends 44 of the pair of arms 42 positioned on the lower side are attached to the storing portion 20 in such a manner as to freely rotate. Upper ends 46 of the pair of arms 42 positioned on the upper side are attached to the supporting portion 30 in such a manner as to freely rotate.

In this structure, the coupling mechanism 40 is supported by the storing portion 20 at two points, and also supports the supporting portion 30 at two points. Thus, the deflection of the supporting portion 30 at both ends in the extending direction of the supporting portion 30, and the twist of the supporting portion 30 with respect to the storing portion 20 (the winding shaft 22) can be both decreased compared with a structure in which the supporting portion 30 is supported only at one point. By this method, lowering of the flatness of the screen 10 caused by the deflection and twist of the supporting portion 30 can be reduced.

The coupling mechanism 40 expands and contracts in the up-down direction by manual or electrically-powered operation of bending and stretching the arms 42 connected with one another. This expansion and contraction of the coupling mechanism 40 moves the storing portion 20 (the winding shaft 22) and the supporting portion 30 close to and away from each other, allowing the screen 10 to be expanded and stored.

The pair of the wires 50 provided between the winding shaft 22 and the supporting portion 30 are disposed outside the pair of the crossing sides 13 along the crossing sides 13. As illustrated in FIG. 3, an annular portion 50a is provided at each end of the wires 50 on the winding shaft 22 (the center axis 24) side. As can be seen from the cross section of the wire 50 on the side opposite to the annular portion 50a in FIG. 3, the wire 50 has a substantially circular cross section, for example. The wires 50 are made of material having elasticity, such as metal. The thickness, i.e., the diameter of each of the wires 50 lies in the range between about 0.5 mm and about 1.0 mm, for example.

The cushioning members 60 cover the peripheries of the respective wires 50. The thickness of each of the cushioning members 60 has approximately the same length as the diameter of each of the wires 50, for example. The cushioning members 60 are made of material having flexibility. The examples of the material constituting the cushioning members 60 include foam resin such as foam urethane, foam rubber, and soft fabric such as felt. The cushioning members 60 may be wound around the wires 50, or sprayed to the peripheries of the wires 50. The cushioning members 60 are provided on the areas of the wires 50 other than the ends on the winding shaft 22 side and on the supporting portion 30 side, for example.

As illustrated in FIG. 2, the plural connecting members 52 are disposed along the respective crossing sides 13 of the screen 10. The connecting members 52 provided along the crossing sides 13 connect the screen 10 and the respective wires 50. The wires 50 give tensions to the screen 10 via the connecting members 52 in the direction toward the outside of the respective crossing sides 13 along the crossing direction. The screen unit which has a structure for tensioning the screen in the crossing direction by using the wires and the connecting members is herein referred to as a tab-tension screen unit.

Structures for fixing the wires 50 and for tensioning the screen 10 by using the wires 50 are now explained.

As illustrated in FIG. 3, a notch 22a is formed on each end of the winding shaft 22 in the extending direction of the winding shaft 22. The notch 22a has a shape extending in the extending direction of the winding shaft 22 from the end of the winding shaft 22, and then extending in the rotational direction of the winding shaft 22. The end of the wire 50 on the winding shaft 22 side inserted into the winding shaft 22 via the notch 22a is supported in such a manner as to freely slide by insertion of the center axis 24 through the annular portion 50a. The wire 50 is wound around the winding shaft 22 together with the screen 10 when the screen 10 is stored.

As illustrated in FIG. 4, the fixing portion 32 has a female screw 34 formed on the supporting portion 30, and a screw 36 inserted into the female screw 34. The end of the wire 50 on the supporting portion 30 side is fixed to the end of the screw 36. By rotation of the screw 36 of the fixing portion 32, the end position of the wire 50 on the supporting portion 30 side can be shifted in the up-down direction for adjustment of the end position.

As illustrated in FIG. 5, the connecting member 52 is a component formed in a through pipe shape and disposed along each of the crossing sides 13. The connecting member 52 has two substantially trapezoidal and flexible components 54, for example. The end of each of the two components 54 on the longer side (lower side of trapezoid) is sewed on the screen 10 to be fixed thereto such that the screen 10 can be sandwiched between the two components 54. The end of each of the two components 54 on the shorter side (upper side of trapezoid) is affixed to the end of the opposite component 54 on the shorter side by a fastener 56 made of metal, synthetic resin or the like, for example. The wire 50 covered with the cushioning member 60 is inserted between the two components 54.

As explained above, the respective wires 50 are disposed outside the crossing sides 13 with both ends of the wires 50 supported by the winding shaft 22 and the supporting portion 30. The winding shaft 22 and the supporting portion 30 are separated from each other by the coupling mechanism 40. Thus, the respective wires 50 are tensioned along the crossing sides 13. The lengths of the respective wires 50 are controlled at the fixing portions 32 such that predetermined tensions can be applied to the wires 50 under the condition in which the winding shaft 22 is separated from the supporting portion 30 via the coupling mechanism 40 (see FIG. 2).

While the predetermined tensions are being applied to the respective wires 50, the wires 50 inserted through the connecting members 52 contact the fasteners 56. In this condition, tensions in the direction outward from the crossing sides 13 along the crossing direction are applied to the respective connecting members 52 provided at the plural points on the respective crossing sides 13. By this method, the screen 10 is tensioned in the left-right direction via the connecting members 52.

When only one connecting member 52 is provided at one position on each of the crossing sides 13, the applied tension is concentrated on the one point. In this case, the screen 10 is easily wrinkled. When the length of the connecting member 52 is equal to the length of the crossing side 13, the connecting member 52 is easily wrinkled. In this case, the screen 10 may be wrinkled as well. According to the screen unit 1 having the plural connecting members 52 at the plural positions on each of the crossing sides 13, the tension applied to the screen 10 is dispersed. Thus, the possibility of generation of wrinkles on the screen 10 lowers.

Accordingly, the screen 10 of the screen unit 1 is tensioned both in the up-down direction and in the left-right direction under the expanded condition. Moreover, the screen 10 has the shape whose central portions in the up-down direction are curved and the shape of left-right symmetry and rotational symmetry. Thus, the screen 10 is radially tensioned from the center toward the periphery. Therefore, winding curls and wrinkles of the screen 10 are reduced, which increases the flatness of the screen 10.

In case of the tab-tension screen unit such as the screen unit 1, the connecting members 52 and the wires 50 are wound around the winding shaft 22 together with the screen 10 when the screen 10 is stored. The width of the screen 10 at the center is smaller than the widths of the side 11 and the side 12, and the wires 50 are provided along the respective crossing sides 13. In this case, an area in which the width between the wires 50 is smaller than the width of the screen 10 in the left-right direction exists.

Thus, under the condition wound around the winding shaft 22, a portion where the screen 10 and the wires 50 overlap with each other exists. When the wires 50 contact the screen 10 in this portion, the base material of the screen 10 may be damaged. This damage on the base material of the screen 10 deteriorates the appearance of the screen 10 in the expanded condition, and also lowers the display quality of the images displayed on the projection surface by non-uniform reflection of light on the damaged portion.

For overcoming this problem, the screen unit disclosed in JP-A-2009-229915 determines each height of the components 54 of the connecting members 52 such that the length between each of the fasteners 56 and the corresponding crossing side 13 becomes larger than the half length of the difference between the width W1 and the width W2 as widths between the crossing sides 13 (see FIG. 1). In this case, the height of the component 54 corresponds to the distance between the shorter side (upper side of trapezoid) and the longer side (lower side of trapezoid) of the component 54.

When the difference between the width W1 and the width W2 as widths between the crossing sides 13 is 150 mm (75 mm for one side), for example, the length between the fastener 56 and the corresponding crossing side 13 is determined at a length longer than 75 mm. Furthermore, when the length between the fastener 56 and the corresponding crossing side 13 is longer than the length of the sum of 75 mm and the diameter of the wire 50, the portion having the smallest width between the wires 50 is positioned outside the boundary 11a and the side 12 having the largest widths in the left-right direction of the screen 10. In this case, no overlapping portion of the screen 10 and the wires 50 is produced in the condition wound around the winding shaft 22. Thus, the contact between the screen 10 and the wires 50 can be avoided.

According to this structure, however, the respective wires 50 are disposed outside farther from the crossing sides 13 of the screen 10. In this case, the lengths of the winding shaft 22 and the supporting portion 30 in the extending direction (left-right direction) increase, which enlarges the size of the screen unit. In case of the arrangement determined above, the lengths of the winding shaft 22 and the supporting portion 30 in the left-right direction become larger than the length of the screen 10 at least by 150 mm (75 mm for one side). The respective wires 50 are disposed outside by 300 mm or longer in the left-right direction from the display area 10a of the screen 10 (see FIG. 1).

Thus, the location of the wires 50 farther away from the crossing sides 13 of the screen 10 and the size increase of the connecting members 52 corresponding to the increase in lengths between the fasteners 56 and the crossing sides 13 deteriorate the appearance of the screen 10 under the expanded condition.

According to the screen unit 1 in this embodiment, however, each of the pair of the wires 50 is covered with the cushioning member 60. Thus, even when the screen 10 and the wires 50 overlap with each other under the condition in which the wires 50 and the screen 10 are wound around the winding shaft 22, the contact between the wires 50 and the base material of the screen 10 can be avoided by the cushioning members 60 interposed between the screen 10 and the wires 50.

In this case, each of the wires 50 can be disposed closer to the corresponding crossing side 13 of the screen 10. Thus, each height of the components 54 of the connecting members (length in the left-right direction) can be reduced. Accordingly, size increase of the screen unit 1 and deterioration of the appearance of the screen 10 in the expanded condition can be avoided while preventing damage produced by the contact between the wires 50 and the base material of the screen 10.

According to the structure of the screen unit 1 in the first embodiment, the following advantages can be offered.

(1) The screen 10 is tensioned both in the up-down direction and in the left-right direction under the expanded condition. In addition, the screen 10 is radially tensioned from the center toward the periphery. In this case, winding curls of the screen 10 and wrinkles on the projection surface of the screen 10 can be reduced. Thus, the flatness of the screen 10 increases.

(2) The respective wires 50 are covered by the cushioning members 60. Thus, the wires 50 do not contact the screen 10 even when the screen 10 wound around the winding shaft 22 overlaps with the wires 50. Accordingly, damage on the base material of the screen 10 can be reduced without size increase of the screen unit 1 and deterioration of the appearance under the expanded condition of the screen 10.

Accordingly, improvement of the appearance of the screen unit 1 and prevention of lowering of the display quality of images displayed on the projection surface of the screen 10 can be both achieved.

Second Embodiment

Figure 6:
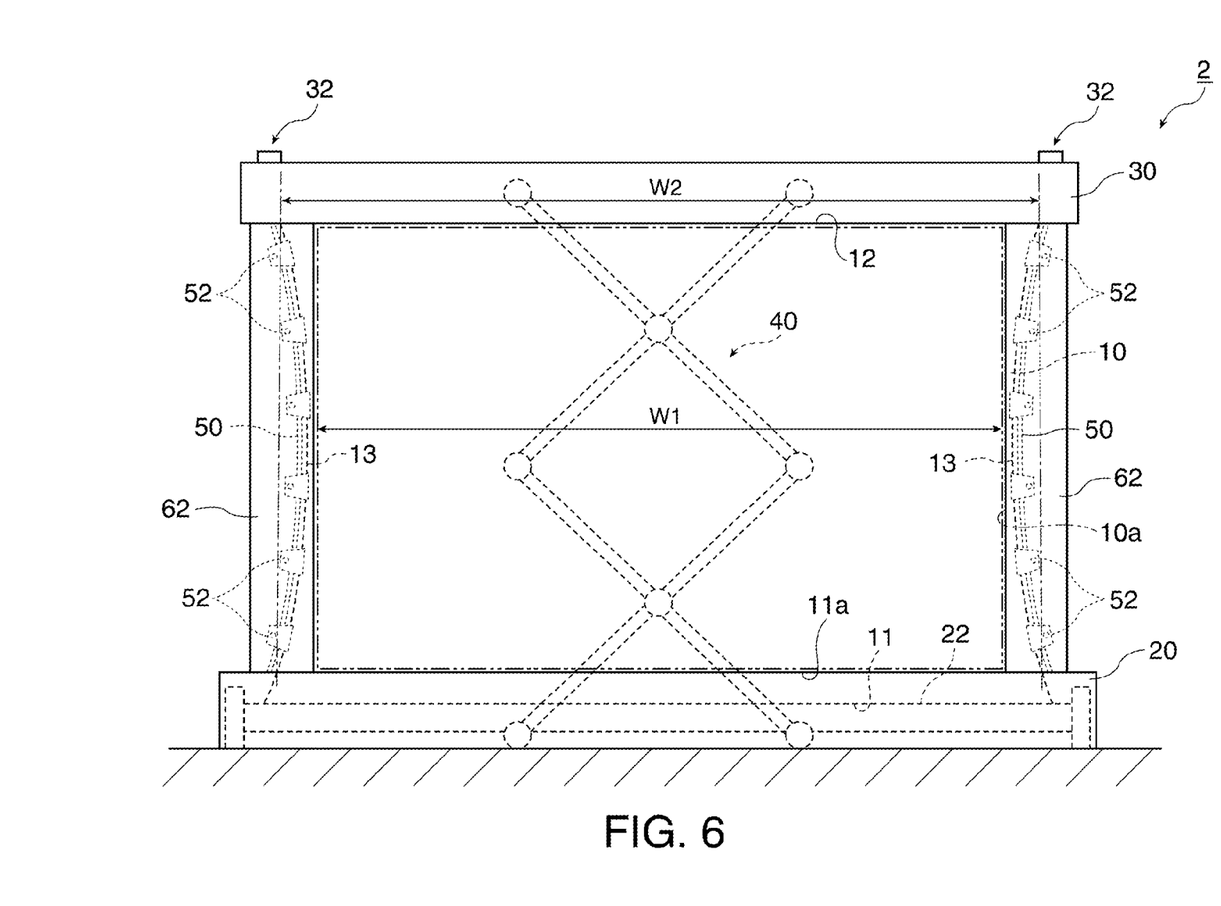
FIG. 6 illustrates the general structure of a screen unit according to a second embodiment.

A screen unit according to a second embodiment is now described with reference to the drawings. FIG. 6 illustrates the general structure of the screen unit in the second embodiment. More specifically, FIG. 6 schematically illustrates the screen unit in the expanded condition as viewed from the front.

The structure of the screen unit according to the second embodiment is similar to that of the screen unit in the first embodiment except for the construction and position of the cushioning members. The same reference numbers are given to components common to those in the first embodiment, and the explanation of the common components is not repeated.

As illustrated in FIG. 6, a screen unit 2 in the second embodiment includes the screen 10, the storing portion 20 having the winding shaft 22, the supporting portion 30, the coupling mechanism 40, a pair of the wires 50, the plural connecting members 52, and a pair of cushioning members 62.

The respective cushioning members 62 in the form of tapes, for example, are provided on the front side of the screen 10. Each of the cushioning members 62 covers the front sides of the wire 50 and the plural connecting members 52 on the corresponding crossing side 13 of the two crossing sides 13. The respective cushioning members 62 are belt-shaped components extending in directions substantially perpendicular to the side 11 and the side 12, and provided along the left and right sides of the display area 10a of the projection surface of the screen 10.

Thus, the areas outside the left and right sides of the display area 10a of the projection surface of the screen 10, that is, the areas where the wires 50 and the connecting members 52 overlap with each other when wound around the winding shaft 22 are covered by the cushioning members 62. Each width of the cushioning members 62 in the left-right direction is approximately 100 mm when the difference between the width W1 and the width W2 as widths between the crossing sides 13 is 150 mm (75 mm for one side), for example.

Similarly to the cushioning members 60 in the first embodiment, the cushioning members 62 are made of material having flexibility. Both ends of each of the cushioning members 62 on the winding shaft 22 side and on the supporting portion 30 side are fixed to the winding shaft 22 and the supporting portion 30 by adhesive double-coated tapes, adhesives or the like, for example.

According to the screen unit 2 in the second embodiment, not only the wires 50 but also the connecting members 52 are covered by the cushioning members 62. In this case, the contact between the connecting members 52 and the screen 10 as well as the contact between the wires 50 and the screen 10 can be avoided under the condition in which the wires 50 and the connecting members 52 are wound around the winding shaft 22 together with the screen 10. Thus, damage to the base material of the screen 10 can be more effectively prevented.

The areas outside the respective crossing sides 13 have level differences between the wires 50 and the connecting members 52 and level differences between the portions containing the wires 50 and the connecting members 52 and the portions not containing the wires 50 or the connecting members 52. When the areas outside the crossing sides 13 are wound around the winding shaft 22 together with the screen 10, these level differences affect the base material of the screen 10 and produce deformations such as depressions thereon. In case of deformations on the base material of the screen 10, the appearance of the screen 10 in the expanded condition deteriorates, and also the display quality of the images displayed on the projection surface lowers due to non-uniform reflection on the deformed portions.

According to the screen unit 2, however, the cushioning members 62 made of flexible material are interposed between the screen 10 and the wires 50 and between the screen 10 and the connecting members 52 under the condition in which the wires 50 and the connecting members 52 are wound around the winding shaft 22 together with the screen 10. In this case, the steps produced by the level differences can be reduced. Thus, deformations on the base material of the screen 10 can be decreased. Accordingly, lowering of the display quality of the images displayed on the projection surface of the screen 10 can be more effectively prevented.

It is preferable that each thickness of the cushioning members 62 is larger than each diameter of the wires 50. In this structure, the steps produced by the wires 50 can be reduced in a preferable manner within the range of the thickness of the cushioning members 62. It is also preferable that each thickness of the cushioning member 62 is larger than the sum of each diameter of the wires 50 and each thickness of the connecting members 52 (two components 54). In this structure, the steps produced by the overlapping portions of the wires 50 and the connecting members 52 can also be reduced in a preferable manner within the range of the thickness of the cushioning members 62. When each diameter of the wires 50 is in the range between about 0.5 mm and about 1.0 mm, for example, each thickness of the cushioning members 62 can be determined within the range between about 1.5 mm and about 2.0 mm.

According to the screen unit 2, the cushioning members 62 cover the front sides of the wires 50 and the connecting members 52. In this case, the wires 50 and the connecting members 52 are not visually recognized from the front side. Thus, the appearance of the screen unit 2 in the expanded condition further improves. In addition, the display area 10a of the projection surface of the screen 10 is surrounded by the storing portion 20, the supporting portion 30, and the pair of the cushioning members 62 like an area surrounded by a frame. Thus, the images displayed on the projection surface of the screen 10 become well-defined, which improves appreciation of the images.

Moreover, the area other than the display area 10a on the projection surface of the screen 10, that is, the area scarcely contributing to the display of the images is covered by the cushioning members 62. When the area other than the display area 10a is exposed, unnecessary light other than image light such as external light and room light is reflected by the area other than the display area 10a. In this case, the contrast of the images displayed on the display area 10a becomes relatively low in some cases. According to the screen unit 2, however, the area scarcely contributing to the display of the images is covered by the cushioning members 62. Thus, relative lowering of the contrast of the images displayed on the display area 10a can be reduced.

It is preferable that the cushioning members 62, the storing portion 20, and the supporting portion 30 have the same color such as black, dark gray or colors close to black. In this structure, the visual effect for defining the images displayed on the projection surface increases, and reflection of light other than image light on the cushioning members 62, the storing portion 20, and the supporting portion 30 decreases.

According to the screen unit 2 in the second embodiment, the following advantages can be offered as well as those of the first embodiment.

(1) The wires 50 and the connecting members 52 are covered by the cushioning members 62. Thus, not only the wires 50 but also the connecting members 52 do not contact the screen 10. Accordingly, damage to the base material of the screen 10 can be more effectively prevented.

(2) The steps produced by the wires 50 and the connecting members 52 are reduced by the cushioning members 62. Thus, deformations such as depressions on the base material of the screen 10 in the condition of the screen 10 wound around the winding shaft 22 can be decreased.

(3) Since the cushioning members 62 are disposed on the front side of the screen 10, the wires 50 and the connecting members 52 are not visually recognized from the front side. Thus, the appearance of the screen unit 2 in the expanded condition further improves.

(4) The display area 10a is surrounded by the storing portion 20, the supporting portion 30, and the belt-shaped cushioning members 62 extending along the left and right sides of the display area 10a like an area surrounded by a frame. Thus, the images displayed on the projection surface of the screen 10 become well-defined, which improves the appreciation of the images.

(5) The area other than the display area 10a on the projection surface of the screen 10 is covered by the cushioning members 62. Thus, reflection of unnecessary light in this area which scarcely contributes to the display of the images can be reduced.

Accordingly, the appearance of the screen unit 2 further improves, and prevention against lowering of the display quality of the images displayed on the projection surface of the screen 10 further effectively enhances.

The embodiments of the invention described herein may be modified in various ways without departing from the scope of the invention. For example, the following modifications may be made.

Modified Example 1

According to the screen unit 2 in the second embodiment, the cushioning members 62 are disposed on the front side of the screen 10. However, the cushioning members 62 may be provided on the back side of the screen 10, or on both the front side and the back side of the screen 10. The cushioning members 62 may be fixed to the wires 50 and the plural connecting members 52.

Modified Example 2

According to the respective embodiments, the screen units 1 and 2 are placed on the floor surface. In this arrangement, the storing portion 20 is disposed on the floor surface side, and the supporting portion 30 is disposed on the ceiling surface side. However, the screen units 1 and 2 may be installed on the ceiling surface. In this case, the storing portion 20 is disposed on the ceiling surface side, and the supporting portion 30 is disposed on the floor surface side. In case of the screen units 1 and 2 placed on the ceiling surface, the screen 10 may be tensioned in the up-down direction by increasing the weight of the supporting portion 30. In this structure, advantages similar to those of the screen unit placed on the floor surface can be provided.

Modified Example 3

According to the screen units 1 and 2 in the respective embodiments, the coupling mechanism 40 has two pairs of the arms 42 to support the supporting portion 30 at two positions. However, the number of the arms 42 may be one pair or three pairs or more, and the number of the points for supporting the supporting portion 30 may be one or three or more.

Modified Example 4

According to the screen units 1 and 2 in the respective embodiments, the screen 10 has the shape whose central portions in the up-down direction are curved toward the opposed side. However, the screen 10 may have a shape whose central portion is curved with respect to the ends of the screen 10 on the side 11 and one of the ends of the screen 10 on the side 12 in a shape such as a trapezoid.

Modified Example 5

According to the screen units 1 and 2, each of the connecting members 52 is produced by affixing the two trapezoidal components 54. However, each shape and length of the components 54 may be arbitrarily determined. Alternatively, each of the connecting members 52 may be produced by folding one piece of the component 54 such that the wire 50 can be inserted through the component 54.

The entire disclosure of Japanese Patent Application No. 2009-280180, filed Dec. 10, 2009 is expressly incorporated by reference herein.

What is claimed is:

1. A screen unit comprising:
a screen having a first side, a second side, and a pair of crossing sides which cross the first side and the second side;
a winding shaft holding the first side and functioning as a shaft around which the screen is wound;
a supporting portion supporting the second side;
a pair of string-shaped members provided between the winding shaft and the supporting portion and disposed outside the pair of crossing sides of the screen in the directions along the pair of crossing sides; and
a plurality of connecting members provided on each of the pair of crossing sides to connect the screen and the pair of string-shaped members,
wherein
the pair of crossing sides are curved toward the inside of the screen, and
a cushioning member is provided around each of the pair of string-shaped members in such a manner that each of the cushioning members surrounds one of the pair of string-shaped members and is disposed between the one of the pair of string-shaped members and the plurality of connecting members provided on the one of the pair of string-shaped members.

2. A screen unit, comprising:
- a screen having a first side, a second side, and a pair of crossing sides which cross the first side and the second side;
- a winding shaft holding the first side and functioning as a shaft around which the screen is wound;
- a supporting portion supporting the second side;
- a pair of string-shaped members provided between the winding shaft and the supporting portion and disposed outside the pair of the crossing sides of the screen in the directions along the pair of the crossing sides; and
- a plurality of connecting members provided on each of the pair of the crossing sides to connect the screen and the pair of the string-shaped members, wherein
- the pair of the crossing sides are curved toward the inside of the screen,
- the first side and the second side extend substantially in parallel with each other, and
- cushioning members are provided at least either on a projection surface side of the screen or on a side opposite to the projection surface side and are disposed in belt shapes in directions substantially perpendicular to the first side and the second side to cover the string-shaped members and the connecting members, each of the plurality of connecting members being disposed between one of the string-shaped members and one of the cushioning members.

3. The screen unit according to claim 1, wherein a thickness of one of the cushioning members is larger than a thickness of one of the pair of string-shaped members.

* * * * *